UNITED STATES PATENT OFFICE.

JAMES PRATT, OF BLACKFRIAR'S ROAD, COUNTY OF SURREY, ENGLAND, ASSIGNOR TO THE GLASS DECORATION COMPANY, (LIMITED,) OF 82 HATTON GARDEN, COUNTY OF MIDDLESEX, ENGLAND.

PROCESS OF GILDING GLASS.

SPECIFICATION forming part of Letters Patent No. 354,343, dated December 14, 1886.

Application filed July 19, 1886. Serial No. 208,466. (No specimens.) Patented in England October 9, 1885, No. 12,014, and in France July 10, 1886.

*To all whom it may concern:*

Be it known that I, JAMES PRATT, silverer and gilder, a subject of the Queen of Great Britain and Ireland, and residing at Nos. 2 and 4 Pocock Street, Blackfriar's Road, in the county of Surrey, England, have invented certain new and useful Improvements in the Process of Gilding Glass, (for which I have made applications for patents in Great Britain No. 12,014, dated October 9, 1885, and France dated July 10, 1886,) of which the following is a specification.

My said invention relates to an improved process of gilding glass, whereby the desired effect is attained in a quicker, more regular, and more economical manner than is the case by the means hitherto employed for gilding glass.

According to my invention the face of the glass to be gilded is thoroughly cleansed, in the usual way, and a solution of chloride of tin (which may be prepared as is usual for silvering glass) is poured over the glass, which is then washed with distilled water and placed on an inclined surface, it preferably being an inclined bed, bench, or table, such as is described in the specification of British Letters Patent granted to me and dated February 2, 1882, No. 515, which table is heated preferably by steam, and a mixture of a dilute solution of chloride of gold—that is, a solution of gold in aqua regia, (hydrochloric acid and nitric acid,) with pure caustic soda and glycerine, with or without mannite—is poured over the glass until the desired thickness of gold becomes deposited on it. The gold coating is then thoroughly washed with distilled water.

The aforesaid mixture I find to answer well if it be prepared in the following way, and with the following proportions of the ingredients. I dilute the ordinary solution of chloride of gold by adding to every three parts thereof, by weight, forty parts, by weight of distilled water. I then prepare a solution of caustic soda by dissolving one part, by weight, of pure caustic soda in twenty parts, by weight, of distilled water, and I also prepare a solution of glycerine and distilled water, taking equal parts, by weight, of each, and to this I prefer to add a few drops of mannite, as I find that it expedites the deposit of the gold on the glass. The soda solution is first added to the glycerine solution, and then just before use they are added to the chloride-of-gold solution.

The following is the best way with which I am acquainted for carrying out the process: I cleanse the glass and treat it with the chloride-of-tin solution in the same manner as is at present practised in treating glass preparatory to silvering it with a solution of nitrate of silver. I then thoroughly wash the glass with distilled water by pouring it thereover, and I remove the glass to the inclined heated table and maintain the heat at about 150° to 200° Fahrenheit, and I then pour over the glass the gilding solution, prepared as before described. The glass should be supported upon a layer of india-rubber cloth, so that there is as little waste of the gilding solution as possible, it being received as it flows from the table in any suitable receptacle, from which it can be taken for reuse. The pouring is continued until the metallic film appears over the whole surface of the glass, which will usually be in about ten minutes, and then the gilded glass is removed and again washed with distilled water. I then cover the gold with silver by pouring over the gilded surface a mixture of nitrate of silver and ammonia with a certain amount of Rochelle salts, as is well known and practiced in silvering glass. The gilding and silvering of the glass having been effected, the metallic coating on the glass can be varnished and painted in the usual manner to protect it from injury.

I claim—

1. In the manufacture of gilded glass, the improvement consisting in first treating the cleaned glass with a solution of chloride of tin, and then pouring over the glass, while supported upon an inclined surface and heated, a gilding solution, substantially as hereinbefore described.

2. In the manufacture of gilded glass, the improvement consisting in pouring over the glass after it has been properly cleaned and prepared a gilding solution while the glass is supported upon an inclined surface and heated, substantially as hereinbefore described.

3. In the manufacture of gilded glass, the improvement consisting in pouring over the surface of the glass properly cleaned and prepared a gilding solution while the glass is supported upon an inclined surface and heated, and then applying to the coating of gold a silver backing, substantially as hereinbefore described.

4. The process of gilding glass by treating the cleaned glass with chloride-of-tin solution, and then pouring over the surface of the glass a gilding solution while the glass is supported upon an inclined surface and heated, and then applying to the coating of gold a silver backing, substantially as hereinbefore described.

In testimony whereof I have signed my name to this specification in the presence of two subscribing witnesses.

JAMES PRATT.

Witnesses:
   EDWD. GEO. DAVIES,
   CHAS. JAS. JONES,
*Both of 47 Lincoln's Inn Fields, London, W. C.*